(12) United States Patent
Cottrell, V.

(10) Patent No.: US 8,137,222 B2
(45) Date of Patent: Mar. 20, 2012

(54) ACCESSORY DRIVE TENSIONER SYSTEM

(75) Inventor: Daniel D. Cottrell, V., Commerce Township, MI (US)

(73) Assignee: GM Global Technology Operations LLC

( * ) Notice: Subject to any disclaimer, the term of this patent is extended or adjusted under 35 U.S.C. 154(b) by 426 days.

(21) Appl. No.: 12/014,921

(22) Filed: Jan. 16, 2008

(65) Prior Publication Data

US 2008/0248907 A1 Oct. 9, 2008

Related U.S. Application Data

(60) Provisional application No. 60/921,798, filed on Apr. 4, 2007.

(51) Int. Cl.
*F16H 7/08* (2006.01)

(52) U.S. Cl. .......................................................... 474/101

(58) Field of Classification Search .................... 474/70, 474/101, 109–111, 133, 140
See application file for complete search history.

(56) References Cited

U.S. PATENT DOCUMENTS

| | | | | |
|---|---|---|---|---|
| 4,270,906 A | * | 6/1981 | Kraft et al. | 474/135 |
| 4,472,162 A | | 9/1984 | Hitchcock | |
| 5,759,125 A | * | 6/1998 | Berg | 474/112 |
| 5,913,743 A | * | 6/1999 | Ohta | 474/112 |
| 6,932,731 B2 | * | 8/2005 | Kaiser et al. | 474/135 |
| 2003/0083164 A1 | * | 5/2003 | MacNaughton et al. | 474/135 |

* cited by examiner

*Primary Examiner* — Robert Siconolfi
*Assistant Examiner* — Vu Q Nguyen

(57) ABSTRACT

An accessory drive tensioner system may include a bracket, a coupling mechanism, and a biasing member. The bracket may have an aperture therethrough and a tensioner hub coupled thereto. The coupling mechanism may extend through the aperture to rotatably couple the bracket to a mounting member that is fixed relative to an engine. The biasing member may be engaged with the coupling mechanism and the bracket to bias the bracket axially along the coupling mechanism.

18 Claims, 3 Drawing Sheets

ACCESSORY DRIVE TENSIONER SYSTEM

CROSS-REFERENCE TO RELATED APPLICATIONS

This application claims the benefit of U.S. Provisional Application No. 60/921,798, filed on Apr. 4, 2007. The disclosure of the above application is incorporated herein by reference.

FIELD

The present disclosure relates to engine accessory drive systems, and more specifically to accessory drive tensioner systems.

BACKGROUND

The statements in this section merely provide background information related to the present disclosure and may not constitute prior art.

Electric hybrid vehicles may include an internal combustion engine, an electric drive motor, and a rechargeable battery that powers the drive motor. The electric motor may transmit power and may charge the battery through an engagement with the engine crankshaft. The engagement may include a belt drive system. The belt drive system may include a belt engaged with the crankshaft and an input/output of the electric motor to transfer rotation therebetween.

The belt drive system may additionally include a tensioner system that maintains tension of the belt during operation. The tensioner system may pivot during operation to maintain tension on the belt. When the motor provides supplemental power to drive the vehicle through the belt drive system, a load from the motor may cause the tensioner system to vibrate, resulting in undesirable noise.

SUMMARY

An accessory drive tensioner system may include a bracket, a coupling mechanism, and a biasing member. The bracket may have an aperture therethrough and a tensioner hub coupled thereto. The coupling mechanism may extend through the aperture to rotatably couple the bracket to a mounting member that is fixed relative to an engine. The biasing member may be engaged with the coupling mechanism and the bracket to bias the bracket axially along the coupling mechanism.

A pivot coupling may include a bushing, a fastener, and a biasing member. The bushing may extend through an aperture in an accessory drive tensioner bracket of an engine. The fastener may include a shank extending through the bushing that is axially fixed relative to the engine and defines a rotational axis for the bracket. The biasing member may be disposed on the shank and may axially bias the bracket along the shank.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
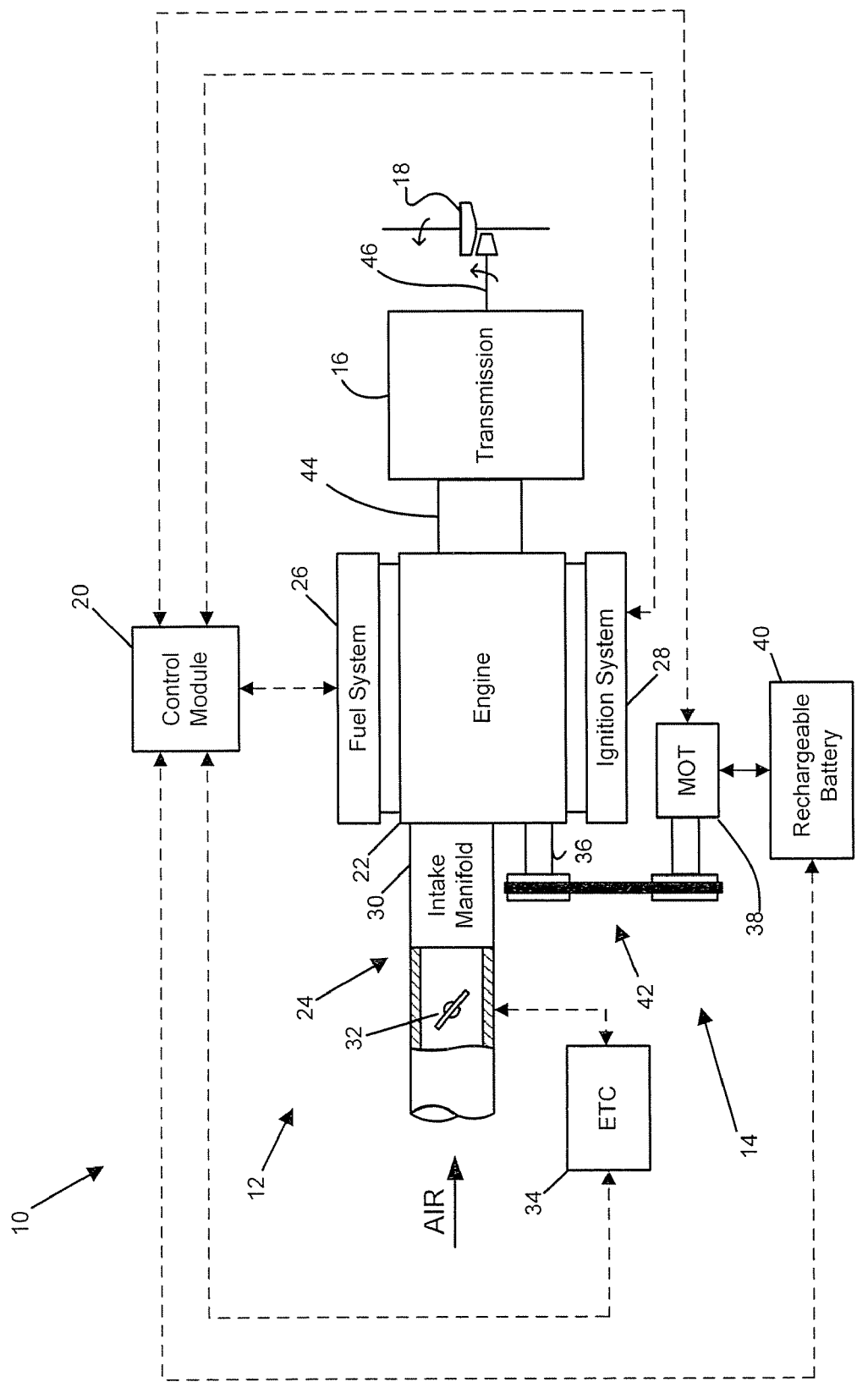
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 is schematically illustrated. Vehicle 10 may include an engine assembly 12, a hybrid power assembly 14, a transmission 16, a drive axle 18, and a control module 20. Engine assembly 12 may include an internal combustion engine 22 in communication with an intake system 24, a fuel system 26, and an ignition system 28. Intake system 24 may include an intake manifold 30, a throttle 32, and an electronic throttle control (ETC) 34. ETC 34 may control throttle 32 to control an air flow into engine 22. Fuel system 26 may include fuel injectors (not shown) to control a fuel flow into engine 22 and ignition system 28 may ignite the air/fuel mixture provided to engine 22 by intake system 24 and fuel system 26.

Hybrid power assembly 14 may include an electric motor 38 and a rechargeable battery 40. Motor 38 may be in electrical communication with battery 40 to convert power from battery 40 to mechanical power. Motor 38 may additionally be operated as a generator to provide power to charge battery 40, as discussed below. Engine 22 and motor 38 may be coupled via an accessory drive system 42, as discussed below.

Engine assembly 12 may drive transmission 16. Engine 22 may include a crankshaft 36 coupled to transmission 16 via a coupling device 44. Coupling device 44 may include a friction clutch or a torque converter. Transmission 16 may use the power provided from engine 22 and/or motor 38 to drive an output shaft 46 and power rotation of drive axle 18. Alternatively, rotation of drive axle 18 may be used to power rotation of crankshaft 36 and to drive motor 38 for recharging of battery 40.

Control module 20 may be in communication with fuel system 26, ignition system 28, ETC 34, motor 38, and battery 40. Control module 20 may control operation of engine 22 and motor 38 and may selectively control recharging of battery 40.

Figure 2:
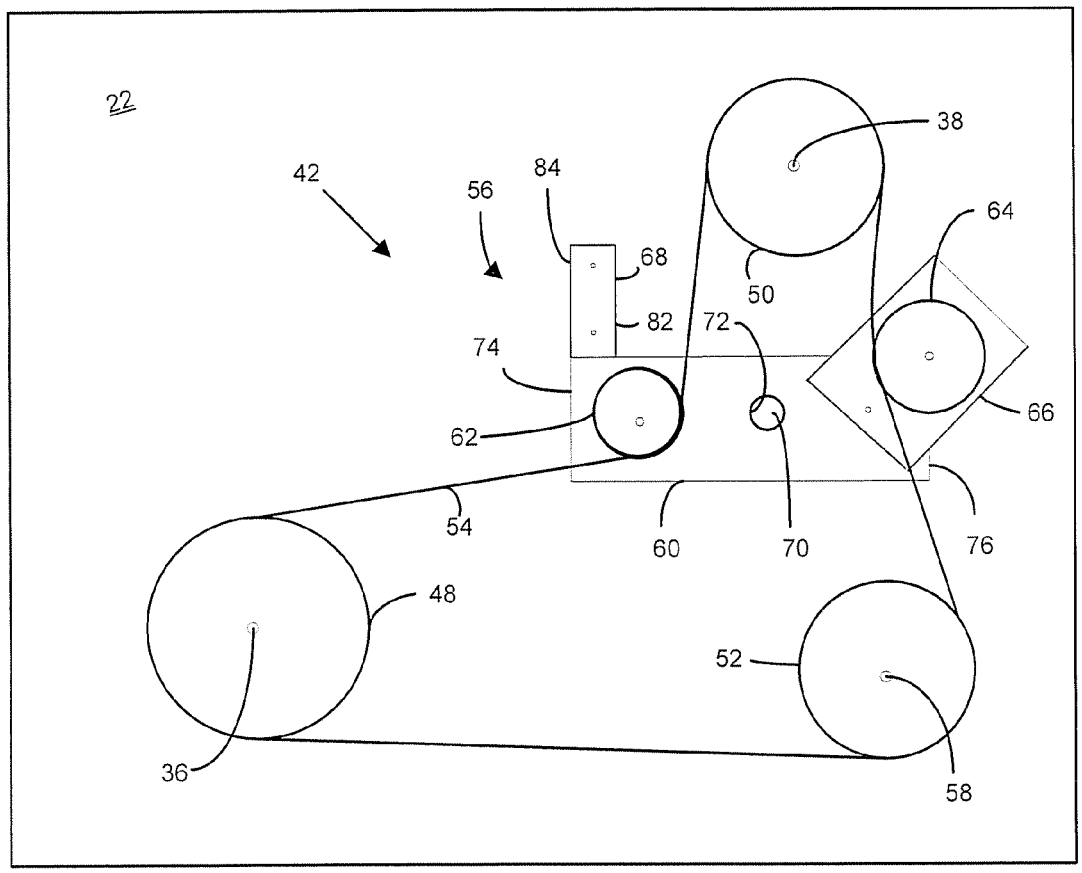
FIG. 2 is a schematic illustration of the accessory drive system of the vehicle of FIG. 1.

With reference to FIG. 2, accessory drive system 42 is schematically illustrated and may include first, second, and third hubs 48, 50, 52, a belt 54, and a tensioner assembly 56. First hub 48 may be fixed to crankshaft 36 for rotation therewith. Second hub 50 may be fixed to an output of motor 38. Third hub 52 may be fixed to an additional component 58 driven by crankshaft 36 and/or motor 38, such as an air conditioner compressor. Belt 54 may be engaged with first, second and third hubs 48, 50, 52 to transfer rotation therebetween.

Tensioner assembly 56 may include a bracket 60, first and second belt tensioner hubs 62, 64, a friction damped rotary tensioner 66, a hydraulic strut tensioner 68, and a pivot coupling 70. Bracket 60 may include an aperture 72 located between first and second ends 74, 76 thereof. First and second belt tensioner hubs 62, 64 may be rotatably coupled to first and second ends 74, 76, respectively. More specifically, second belt tensioner hub 64 may be coupled to friction damped rotary tensioner 66 which may be coupled to second end 76 of bracket 60. Hydraulic strut tensioner 68 may include a first end 82 coupled to first end 74 of bracket 60 and a second end 84 coupled to engine 22.

Figure 3:
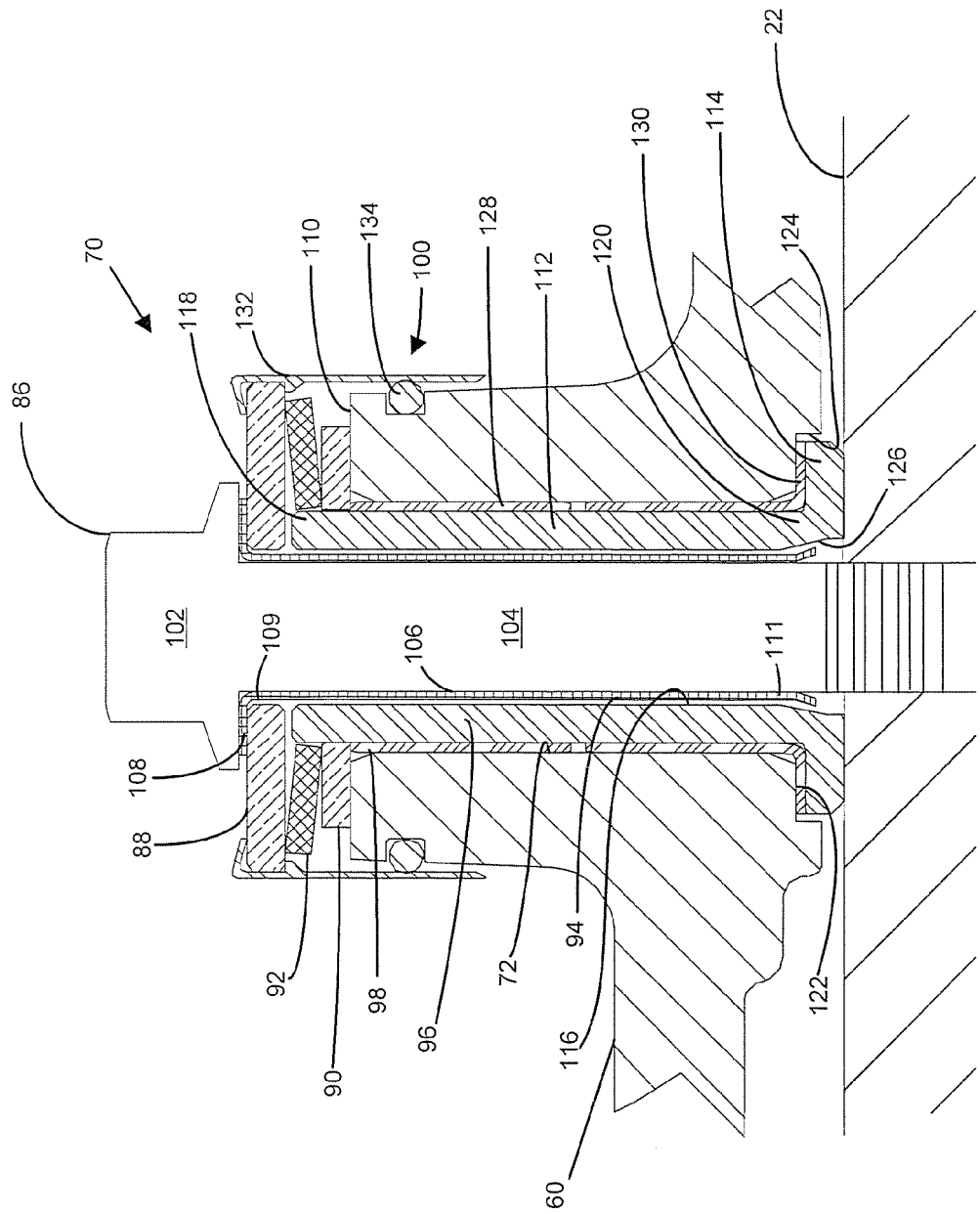
FIG. 3 is a schematic sectional view of a pivot coupling of the accessory drive system of FIG. 2.

With reference to FIG. 3, pivot coupling 70 may extend through aperture 72 to pivotally couple bracket 60 to engine 22. Pivot coupling 70 may include a fastener 86, first and second washers 88, 90, a biasing member 92, a sleeve 94, a bushing 96, a bearing 98, and a dust shield assembly 100. Fastener 86 may extend through aperture 72 to couple bracket 60 to engine 22. More specifically, fastener 86 may include a head 102 having a shank 104 extending therefrom. Shank 104 may extend into engine 22 and may include a threading thereon to axially fix fastener 86 to engine 22.

Sleeve 94 may include longitudinally and radially extending portions 106, 108. Longitudinally extending portion 106 may surround shank 104. Radially extending portion 108 may extend from a first end 109 of longitudinally extending portion 106 and may abut a lower surface of head 102 of fastener 86. A second end 111 of longitudinally extending portion 106 may be swaged to have a radially outward extent to couple first and second washers 88, 90, biasing member 92, sleeve 94, bushing 96, bearing 98, and a dust shield assembly 100 to bracket 60.

First and second washers 88, 90 may be located about shank 104 of fastener 86 at a location between head 102 and a radially extending end surface 110 of bracket 60 proximate aperture 72. First washer 88 may abut radially extending portion 108 of sleeve 94 located axially between head 102 and first washer 88. Second washer 90 may be located axially between bracket 60 and first washer 88. More specifically, second washer 90 may abut radially extending end surface 110 of bracket 60.

Biasing member 92 may be located about shank 104 and axially between first and second washers 88, 90. Biasing member 92 may include a belleville washer, a compression spring, or any other appropriate biasing member. Biasing member 92 may have a generally conical shape. A first end of biasing member 92 that abuts first washer 88 may have a greater diameter than a second end of biasing member 92 that abuts second washer 90. The engagement between the second end of biasing member 92 and second washer 90 may provide a lower rotational resistance than the engagement between the first end of biasing member 92 and first washer 88. Therefore, the first end of biasing member 92 may remain fixed relative to the first washer 88 and the second washer 90 may rotate relative to the second end of biasing member 92.

Bushing 96 may include longitudinally and radially extending portions 112, 114. Longitudinally extending portion 112 may include a bore 116 receiving fastener 86 and sleeve 94 therein. A first end 118 of longitudinally extending portion 112 may extend through second washer 90 and biasing member 92 and may be disposed proximate a lower surface of first washer 88. Radially extending portion 114 may extend radially from a second end 120 of longitudinally extending portion 112 and may extend along a radially extending end surface 122 of bracket 60 proximate aperture 72 and generally opposite radially extending end surface 110. Radially extending end surface 122 may form a recess 124 receiving radially extending portion 114 therein. Bore 116 may include an increased diameter portion 126 near second end 120 for engagement with the second end 111 of sleeve 94 after swaging.

Bearing 98 may include longitudinally and radially extending portions 128, 130. Longitudinally extending portion 128 may be disposed radially between longitudinally extending portion 112 of bushing 96 and aperture 72. Radially extending portion 130 may be disposed axially between radially extending end surface 122 of bracket 60 and radially extending portion 114 of bushing 96. Bearing 98 may bearingly support bracket 60 on bushing 96 for rotation about a longitudinal axis of fastener 86.

Dust shield assembly 100 may include a dust shield 132 and a seal 134. Dust shield 132 may be fixed to first washer 88 and seal 134 may be engaged with bracket 60 and dust shield 132 to form a sealed grease pocket.

Pivot coupling 70 may generally bias bracket 60 in an axial direction along the longitudinal axis of fastener 86. Axial biasing of bracket 60 may generally reduce vibrations generated by motor 38. Biasing member 92 may generally apply an axial biasing force to first and second washers 88, 90, urging first washer 88 axially outwardly relative to engine 22 and second washer axially inwardly toward engine 22. Since first washer 88 engages head 102 of fastener 86, which is axially fixed to engine 22, and second washer 90 engages bracket 60, biasing member 92 may generally bias bracket 60 and bushing 96 axially along the longitudinal axis of fastener 86 toward engine 22. Radially extending portion 114 may generally abut engine 22 as a result of the axial biasing force provided by biasing member 92.

More specifically, biasing member 92 may axially bias bracket 60 against radially extending portion 130 of bearing 98, and therefore against radially extending portion 114 of bushing 96 to urge bushing against engine 22. Fastener 86 may modify the biasing force applied by biasing member 92 by adjusting an installed length of biasing member 92. More specifically, the axial extent of insertion of fastener 86 may modify the biasing force applied by biasing member 92. Bushing 96 may limit the biasing force applied by biasing member 92. First end 118 of longitudinally extending portion 112 may provide a stop for axial insertion of fastener 86 within engine 22. More specifically, first end 118 may abut a lower surface of first washer 88 to define a minimum installed length of biasing member 92.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An accessory drive tensioner system comprising:
a bracket having an aperture;
a first tensioner hub coupled to said bracket;
a rotary tensioner having a first end rotatably coupled to said bracket;
a second tensioner hub coupled to a second end of said rotary tensioner;
a coupling mechanism extending through said aperture to rotatably couple said bracket to an engine and including a fastener and a bearing, said fastener including a shank extending through said aperture, defining a rotational axis for said bracket, said fastener being located radially outside of said first tensioner hub and securing said bracket to said engine, and said bearing located radially between said fastener and said aperture;
a first washer disposed on said shank and engaging a structure that is axially fixed relative to said engine;

a second washer disposed on said shank and engaging an axial end surface of said bracket; and a biasing member disposed between said first and second washers and engaged with said coupling mechanism via said first washer, said biasing member engaged with said bracket via said second washer and biasing said bracket axially along said coupling mechanism.

2. The accessory drive tensioner system of claim 1, wherein said coupling mechanism defines an installed length of said biasing member and a predetermined axial biasing force therefrom.

3. The accessory drive tensioner system of claim 1, wherein said biasing member provides an axial biasing force to an axial end surface of said bracket.

4. The accessory drive tensioner system of claim 1, wherein said coupling mechanism includes a bushing having an axially extending portion located within said aperture and a radially extending portion extending from an end thereof and overlying an axial end surface of said bracket, said shank extending through said bushing and axially fixing said fastener relative to said engine.

5. The accessory drive tensioner system of claim 4, wherein said fastener includes a head having said shank extending therefrom, said biasing member applying an axial biasing force to said head and said bracket and biasing said bracket toward said radially extending portion of said bushing.

6. The accessory drive tensioner system of claim 4, wherein an installed length of said biasing member is controlled by insertion of said fastener into said engine.

7. The accessory drive tensioner system of claim 6, wherein said bushing defines a limit for said insertion of said fastener.

8. The accessory drive tensioner system of claim 1, wherein said biasing member is located on said shank and axially biases said bracket along said shank.

9. The accessory drive tensioner system of claim 1, wherein said axially fixed structure includes a head of said fastener.

10. The accessory drive tensioner system of claim 1, wherein said first and second tensioner hubs are engaged with a belt coupled to a pulley of an electric motor that is driven by said belt in a first mode of operation and that drives said belt in a second mode of operation, said biasing member damping vibration of said bracket from a load applied by said electric motor.

11. The accessory drive tensioner system of claim 1, wherein said biasing member biases said bracket axially along said coupling mechanism toward said engine.

12. A pivot coupling comprising:
a bushing extending through an aperture in an accessory drive tensioner bracket of an engine;
a bearing located on an outer radial surface of said bushing and within said aperture to rotatably support said accessory drive tensioner bracket on said bushing;
a fastener including a shank extending through said bushing and being axially fixed relative to said engine, said fastener located radially outward from a tensioner hub that is coupled to said bracket, said fastener located radially outward from a first end of a rotary tensioner coupled to said bracket, and said fastener defining a rotational axis for said bracket;
a first washer located on said shank;
a second washer located on said shank; and
a biasing member disposed between said first and second washers on said shank that axially biases said bracket along said shank.

13. The pivot coupling of claim 12, wherein said bushing includes an axially extending portion located within said aperture and a radially extending portion overlying an axial end surface of said bracket.

14. The pivot coupling of claim 13, wherein said biasing member biases said bracket toward said radially extending portion.

15. The pivot coupling of claim 12, wherein said first washer engages a structure that is axially fixed relative to said engine and said second washer engages an axial end surface of said bracket.

16. The pivot coupling of claim 15, wherein said axially fixed structure is a head of said fastener.

17. The pivot coupling of claim 12, wherein said bushing defines a minimum installed length of said biasing member.

18. The pivot coupling of claim 12, wherein said biasing member biases said bracket axially along said shank toward said engine.

* * * * *